United States Patent
Sato et al.

(10) Patent No.: US 7,665,384 B2
(45) Date of Patent: Feb. 23, 2010

(54) BICYCLE CONTROL DEVICE

(75) Inventors: Hisayuki Sato, Osaka (JP); Daisuke Nago, Osaka (JP); Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 248 days.

(21) Appl. No.: 11/756,706

(22) Filed: Jun. 1, 2007

(65) Prior Publication Data
US 2008/0295636 A1    Dec. 4, 2008

(51) Int. Cl.
*F16C 1/10* (2006.01)
*G05G 11/00* (2006.01)

(52) U.S. Cl. .................................. 74/502.2; 74/489
(58) Field of Classification Search ............... 74/501.6, 74/502.2, 488, 489
See application file for complete search history.

(56) References Cited

U.S. PATENT DOCUMENTS

| | | | |
|---|---|---|---|
| 4,532,825 A | 8/1985 | Nagano | |
| 4,995,280 A | 2/1991 | Tagawa | |
| 5,094,120 A | 3/1992 | Tagawa | |
| 5,257,683 A | 11/1993 | Romano | |
| 5,400,675 A | 3/1995 | Nagano | |
| 6,155,132 A | 12/2000 | Yamane | |
| 6,810,764 B2 | 11/2004 | Chen | |
| 7,194,928 B2 | 3/2007 | Kawakami | |
| 2004/0089092 A1* | 5/2004 | Campagnolo | 74/502.2 |
| 2007/0137388 A1* | 6/2007 | Dal Pra | 74/502.2 |
| 2007/0245847 A1* | 10/2007 | Chen | 74/502.2 |

FOREIGN PATENT DOCUMENTS

JP    3283289 B2    3/2002

* cited by examiner

*Primary Examiner*—Richard W L Ridley
*Assistant Examiner*—James Pilkington
(74) *Attorney, Agent, or Firm*—Global IP Counselors, LLP

(57) ABSTRACT

A bicycle control device is basically provided with a base member, a shift control unit, a control member and a first shift operating lever. The shift control unit is mounted to the base member. The control member includes a first portion operatively coupled to the shift control unit and a second portion spaced from the first portion. The first shift operating lever is movably coupled relative to the base member to move along a first shift operating path and movably coupled relative to the base member to move along a non-shift operating path that is non-coincident with the first shift operating path. The first shift operating lever is slidably engaged with the second portion of the control member such that the second portion of the control member is moved when the first shift operating lever is moved along the non-shift operating path with sliding contact therebetween.

11 Claims, 16 Drawing Sheets

BICYCLE CONTROL DEVICE

BACKGROUND OF THE INVENTION

1. Field of the Invention

This invention generally relates to a bicycle control device for operating a bicycle component. More specifically, the present invention relates to a bicycle control (component actuating) device that has a shift operating member movable in both a shift operating plane and a non-shift operating plane.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices for performing shifting and braking operations.

Typically, bicycle shifters mechanically operate derailleurs via cables, while bicycle brake levers mechanically operate brake devices via cables. In either case, an operating force is typically applied by one of the rider's fingers to operate a control lever, which in turn transmitted the operating force to the drive component of a bicycle shifting mechanism by a cable that was fixed at one end to the control lever. Currently, many different types of control devices exist for performing shifting and braking operations.

Sometimes the bicycle shifter and the bicycle brake lever are combined as a single integrated unit, while other times they are separate individual units. In the case of road bikes with drop type handlebars, the bicycle shifter and the bicycle brake lever are often combined as a single integrated control device. In some cases, a braking function and a shifting function is performed by a single dual function lever, One example of this type of control device is disclosed in U.S. Pat. No. 5,400,675 to Nagano (assigned to Shimano, Inc). More typically, one or two shift levers are provided in addition to the brake lever. One example of this type of control device is disclosed in U.S. Pat. No. 5,257,683 to Romano (assigned to Campagnolo). While these types of control devices work well, it is desirable to provide a bicycle control (component actuating) device that is relatively easily to manufacture and that is relatively easily for a rider to operate.

In view of the above, it will be apparent to those skilled in the art from this disclosure that there exists a need for an improved bicycle component actuating device. This invention addresses this need in the art as well as other needs, which will become apparent to those skilled in the art from this disclosure.

SUMMARY OF THE INVENTION

One object of the present invention is to provide a control (component actuating) that has a shift operating member movable in both a shift operating plane and a non-shift operating plane with a sliding connection between a control member and the shift operating member.

The foregoing objects can basically be attained by providing a bicycle control device that basically comprises a base member, a shift control unit, a control member and a first shift operating lever. The shift control unit is mounted to the base member. The control member includes a first portion operatively coupled to the shift control unit and a second portion spaced from the first portion. The first shift operating lever is movably coupled relative to the base member to move along a first shift operating path and movably coupled relative to the base member to move along a non-shift operating path that is non-coincident with the first shift operating path. The first shift operating lever is slidably engaged with the second portion of the control member such that the second portion of the control member is moved when the first shift operating lever is moved along the non-shift operating path with sliding contact therebetween.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
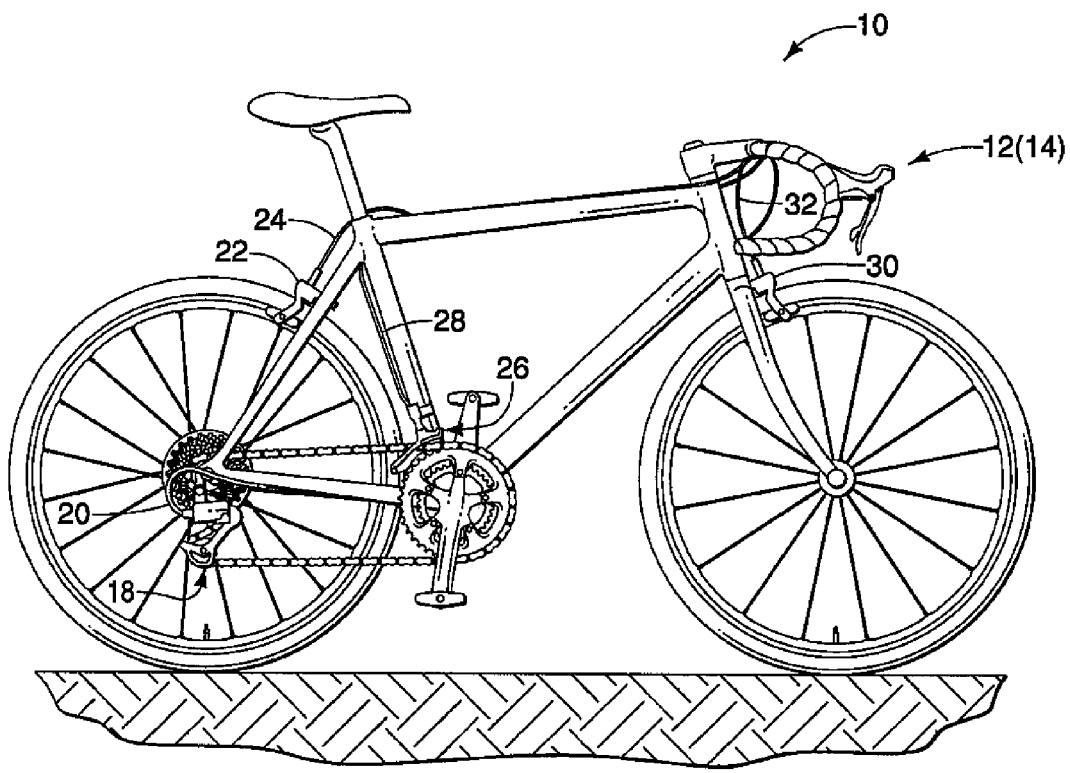
FIG. 1 is a side elevational view of bicycle equipped with a pair of bicycle component actuating (brake/shift) devices (only one shown) coupled to a drop type handlebar in accordance with a preferred embodiment of the present invention.
Figure 2:
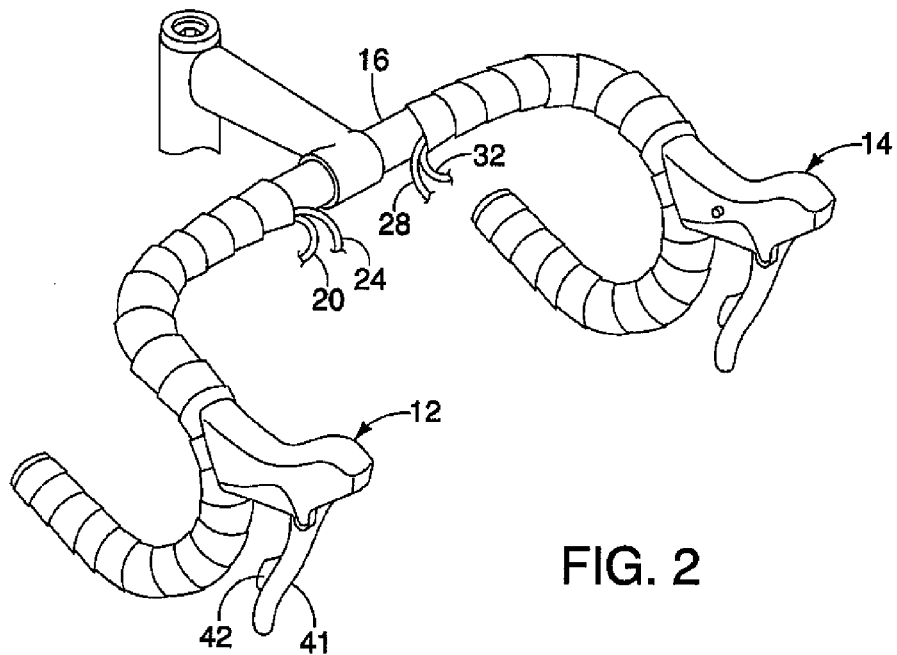
FIG. 2 is an enlarged partial perspective view of the drop type handlebar with the pair of bicycle component actuating (brake/shift) devices in accordance with the illustrated embodiment of the present invention.

Referring initially to FIGS. 1 and 2, a bicycle 10 is illustrated in accordance with a pair of bicycle control devices 12 and 14 mounted on a bicycle handlebar 16 in accordance with one embodiment of the present invention. The bicycle control device 12 is a right hand side control device operated by the rider's right hand, while the bicycle control device 14 is a left hand side control device operated by the rider's left hand. In the illustrated embodiment, the bicycle control device 12 is operatively coupled to a rear derailleur 18 via a shift control cable 20 and a rear brake device 22 via a brake control cable 24. The bicycle control device 14 is operatively coupled to a front derailleur 26 via a shift control cable 28 and a front brake device 30 via a brake control cable 32. Alternatively, the bicycle control devices 12 and 14 can be switched so that the rider can operate the rear derailleur 18 and the front derailleur 26 with opposite hands and/or operate the rear and front brake devices 22 and 30 with opposite hands. In the illustrated embodiment, the left hand side bicycle control device 14 is substantially identical to the right hand side bicycle control device 12, except for the shifting unit has been modified to reduce the number of gears that can be shifted. In any event, the left hand side bicycle control device 14 is essentially identical in construction and operation to the right hand side bicycle control device 12, except that the left hand side bicycle control device 14 is a mirror image of the right hand side bicycle control device 12 and the number of shift positions for the left hand side bicycle control devices 12 and 14 are different. Thus, only the right hand side bicycle control device 12 will be discussed and illustrated herein. Preferably, the cables 20, 24, 28 and 32 are conventional bicycle control cables that have an outer casing the covers an inner wire.

Figure 3:
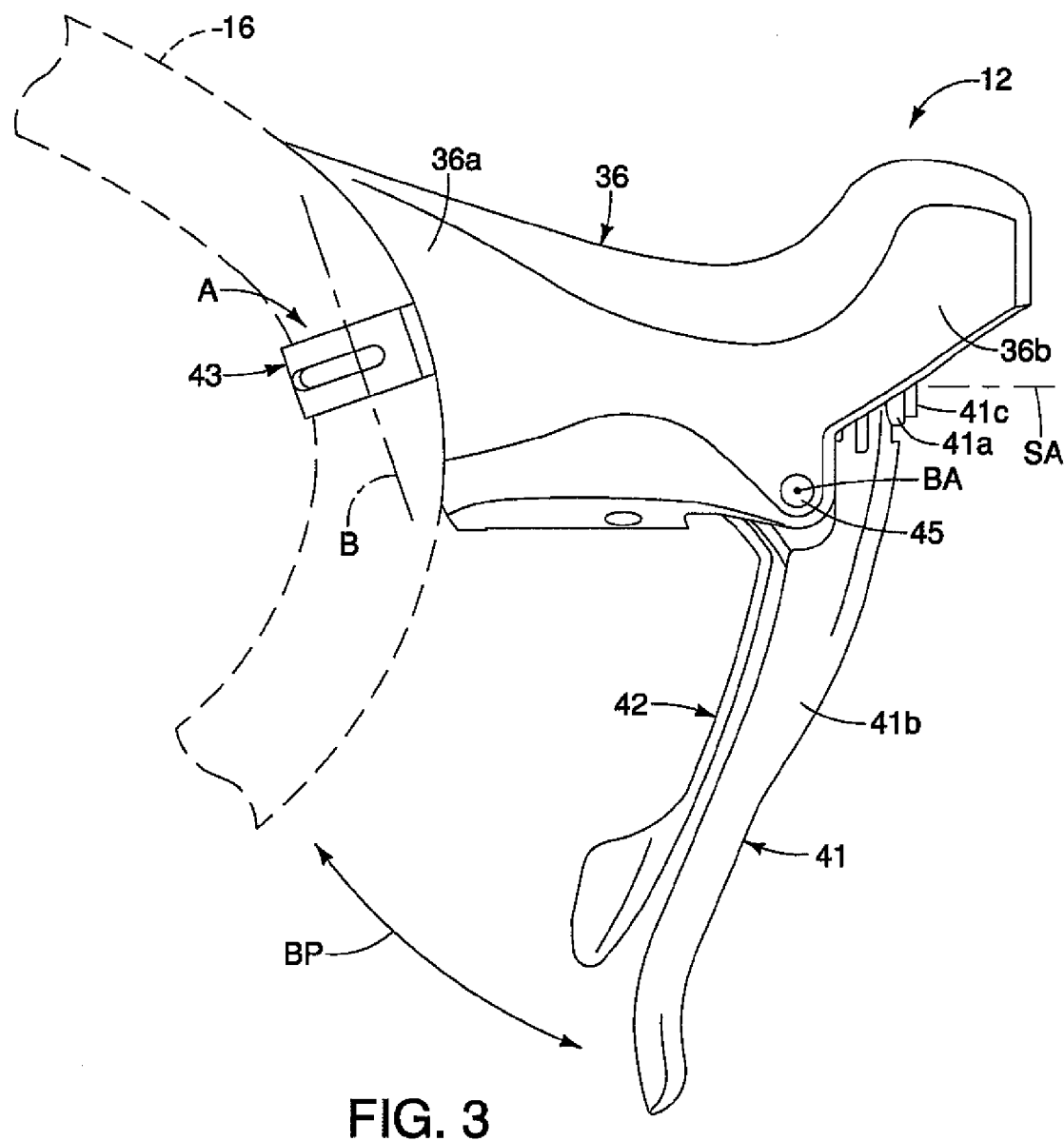
FIG. 3 is an outside elevational view of the right bicycle component actuating (brake/shift) device with the first and second operating levers in the rest positions.
Figure 12:
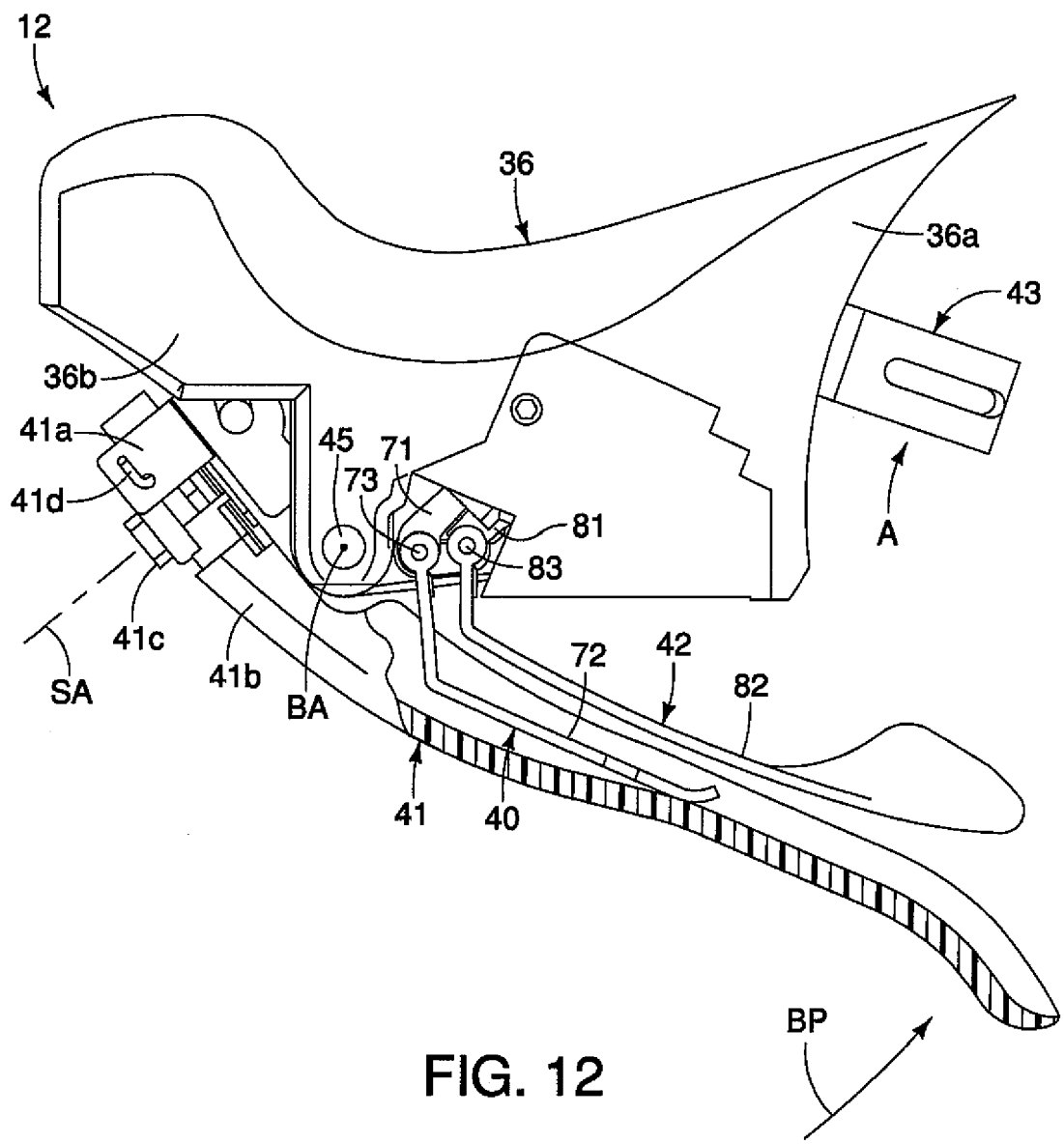
FIG. 12 is an inside elevational view of the right bicycle component actuating (brake/shift) device with the first shift operating lever moved to a braking position and the second shift operating lever moved to a non-shifting position by the first shift operating lever.

Referring now to FIGS. 3 and 12, the bicycle control device 12 basically includes a base member 36, a shift control unit 38, a control member 40, a first shift operating lever 41 and a second shift operating lever 42. The first shift operating lever 41 is a dual function operating lever that performs a braking operation in addition to a shifting operation. Thus, the bicycle control device 12 is configured and arranged to perform both a braking operation and a shifting operation as a single integrated unit that is mounted to the handlebar 16. In the illustrated embodiment, the first shift operating lever 41 is configured and arranged to perform a wire pulling operation and a braking operation, while the second shift operating lever 42 is configured and arranged to perform a wire releasing operation. The second shift operating lever 42 is located behind the first shift operating lever 41, when the first and second shift operating levers 41 and 42 are in rest positions. The first and second shift operating levers 41 and 42 are aligned in a movement plane or path BP of the first shift operating lever 41, when the first and second shift operating levers 41 and 42 are in rest positions.

The base member 36 includes a main body having a first end section 36a with a handlebar mounting structure 43 and a second end section 36b remotely disposed from the first end section 36a. The first and second shift operating levers 41 and 42 are located at the second end section 36 of the main body. The base member 36 is fixedly mounted to the handlebar 16 by the handlebar mounting structure 43, which defines a handlebar receiving area A with a central handlebar mounting axis B. The handlebar mounting structure 43 is preferably a conventional band clamp or similar structure.

In the illustrated embodiment, the shift control unit 38 is a cable operating device that includes a wire takeup member 51. The wire takeup member 51 is attached to the inner wire of the shift control cable 20 to pull and release the inner wire of the shift control cable 20 in response to operation of the first and second shift operating levers 41 and 42, respectively. The first shift operating lever 41 is operatively coupled to the shift control unit 38 via the control member 40 to operate the shift control unit 38 (mainly, the wire takeup member 51) in a first operating direction D1 or a wire pulling direction about a main pivot shaft 44 of the shift control unit 38. The second shift operating lever 42 is operatively coupled to the shift control unit 38 to operate the shift control unit 38 (mainly, the wire takeup member 51) in a second operating direction D2 or a wire releasing direction about the main pivot shaft 44 of the shift control unit 38.

The first shift operating lever 41 preferably includes a mounting part 41a and an operating part 41b with the operating part 41b pivotally mounted to the mounting part 41a by a pivot pin 41c about a shift axis SA. The mounting part 41a of the first shift operating lever 41 is also movably coupled relative to the base member 36 by a pivot pin 45 about a brake lever pivot axis BA for performing the braking operation. Thus, the operating part 41b of the first shift operating lever 41 is movably coupled to mounting part 41a (i.e., relative to the base member 36) to move along a first shift operating plane or path P1 and movably coupled relative to the base member 36 to move along a non-shift (brake) operating plane or path BP that is non-coincident with the first shift operating plane or path P1. The operating part 41b is biased about the pivot pin 41c to a rest position with respect the first shift operating plane or path P1 by a biasing element 41d. Ball and recess type positioning mechanism 41e is attached to the mounting part 41a to maintain the operating part 41b of the first operating lever 41 in the rest position. The first shift operating lever 41 is operatively coupled to the shift control unit 38 via the control member 40 to operate the wire takeup member 51 of the shift control unit 38 in the first operating direction D1 as explained below. The first shift operating lever 41 is slidably engaged with the control member 40 such that the control member 40 is moved when the first shift operating lever 41 is moved along the non-shift (brake) operating path BP with sliding contact therebetween.

The second shift operating lever 42 is operatively coupled to the shift control unit 38 to move along a second shift operating plane or path P2 to operate the wire takeup member 51 of the shift control unit 38 in the opposite (second) operating direction D2 from the first operating direction D1 due to operation of the first shift operating lever 41. The second shift operating lever 42 and the control member 40 pivot about a coincident pivot axis when performing shifting operations as explained below.

Thus, the first and second shift operating levers 41 and 42 are coupled relative to the base member 36 to move along first and second shift operating planes P1 and P2, respectively, that intersect with the non-shift (brake) operating plane or path BP (movement plane) of the first shift operating lever 41. The non-shift (brake) operating plane or path BP (movement plane) of the first shift operating lever 41 is perpendicularly oriented with respect to the first and second shift operating planes or paths P1 and P2 of the first and second shift operating levers 41 and 42.

Now referring to FIGS. 4 to 17, the movements of the first and second shift operating levers 41 and 42 will now be generally discussed with respect to the base member 36 that is configured to be fixedly mounted to the handlebar 16 by the handlebar mounting structure 43.

As seen in FIGS. 4 to 7, in this illustrated embodiment, the first and second shift operating levers 41 and 42 are configured and arranged relative to each other such that they are aligned in the non-shift (brake) operating path BP to move in the non-shift (brake) operating path BP. In particular, the second shift operating lever 42 is located behind the first shift operating lever 41. The control member 40 contacts the rearward facing side of the first shift operating lever 41 and is located between the first and second shift operating levers 41 and 42. The first shift operating lever 41 is configured and arranged to pivot in a first rotational direction with respect to the base member 36 from the rest position of the first shift operating lever 41. The second shift operating lever 42 is configured and arranged to pivot in a second rotational direction with respect to the base member 36 from the rest position of the second shift operating lever 42, with the first and second rotational directions being directions toward a central longitudinal plane of the bicycle.

As seen in FIGS. 4, 8 to 11, in this illustrated embodiment, the first and second shift operating levers 41 and 42 are configured and arranged relative to each other such that the second shift operating lever 42 is moved by the first shift operating lever 41 when the first shift operating lever 41 is operated to move the wire takeup member 51 of shift control unit 38 in the first operating direction D1 about the main pivot shaft 44 of the shift control unit 38. In other words, when a wire pulling operation is desired, the rider pushes the first shift operating lever 41 in a direction transverse to a center plane of the base member 36 along the first shift operating plane or path P1 from the first (rest) position (FIG. 4) to a second (shifting) position (FIGS. 8 to 11) to operate the shift control unit 38. This movement of the first shift operating lever 41 operates the wire takeup member 51 of shift control unit 38 via the control member 40 in the first operating direction D1 which is a wire pilling operation in the illustrated embodiment. As mentioned above, the second shift operating lever 42 moves with the first shift operating lever 41 as the first shift operating lever 41 is moved from the first (rest) position to the second (shifting) position to operate the shift control unit 38.

As seen in FIGS. 4, 12 to 15, in the illustrated embodiment, the first shift operating lever 41 pivots about the pivot pin 45 between a first (rest) position (FIG. 4) and a second (braking) position (FIGS. 12 to 15) along the non-shift (brake) operating plane or path BP. The non-shift (brake) operating plane or path BP also constitutes a movement plane such that the first shift operating lever 41 is pivotally coupled relative to the base member 36 about the pivot axis BA along the movement plane (BP). The movement of the first shift operating lever 41 from the rest position to the braking position results in the first and second shift operating levers 41 and 42 also being pivoted along the non-shift (brake) operating plane BP as seen in FIGS. 12 to 15.

Figure 4:
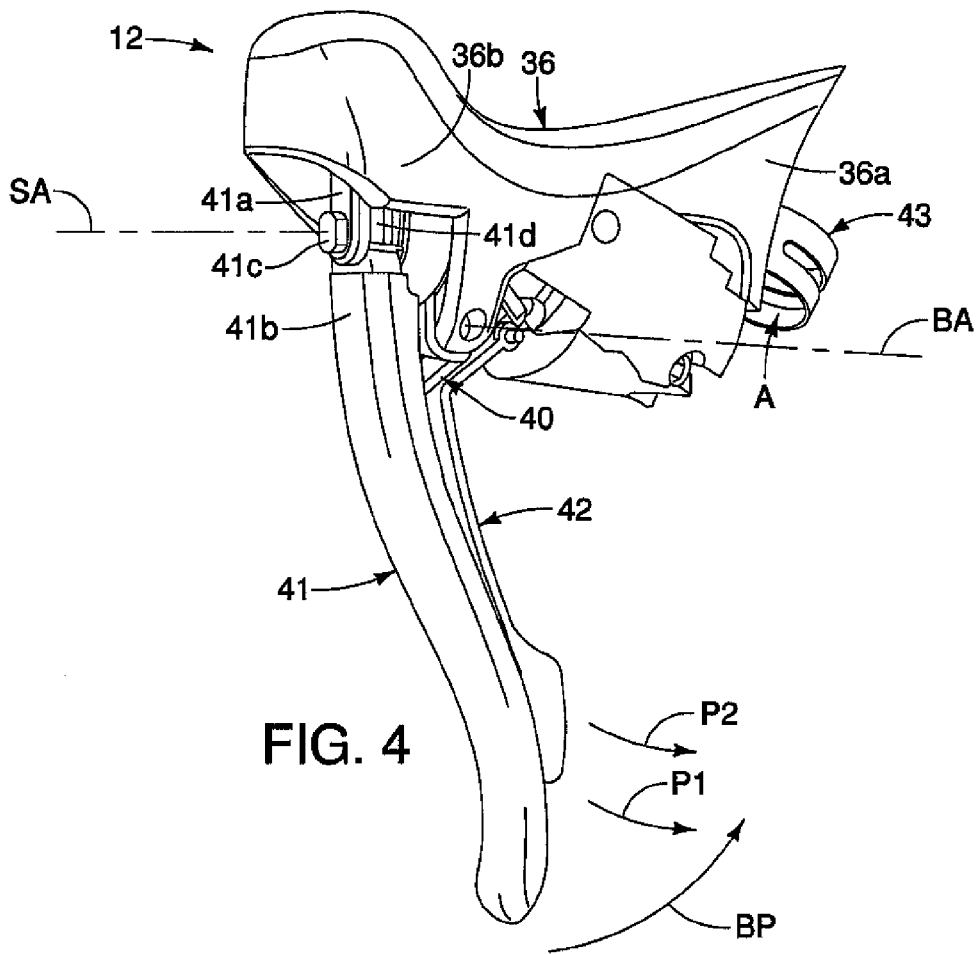
FIG. 4 is an inside perspective view of the night bicycle component actuating (brake/shift) device with the first and second shift operating levers in the rest positions.
Figure 5:
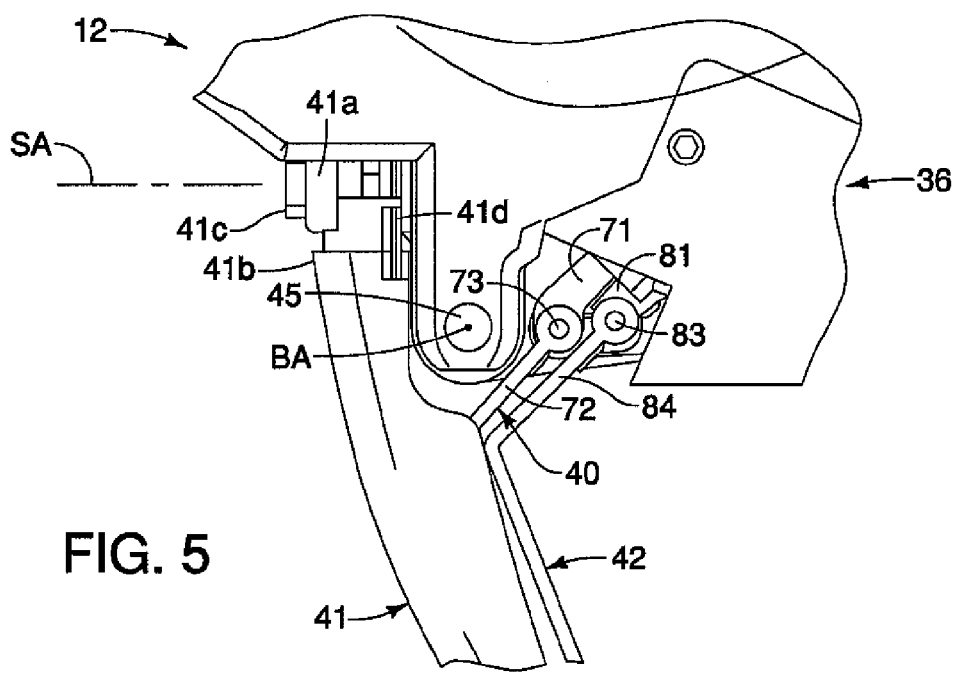
FIG. 5 is an enlarged partial inside elevational view of the right bicycle component actuating (brake/shift) device with the first and second shift operating levers in the rest positions.
Figure 6:
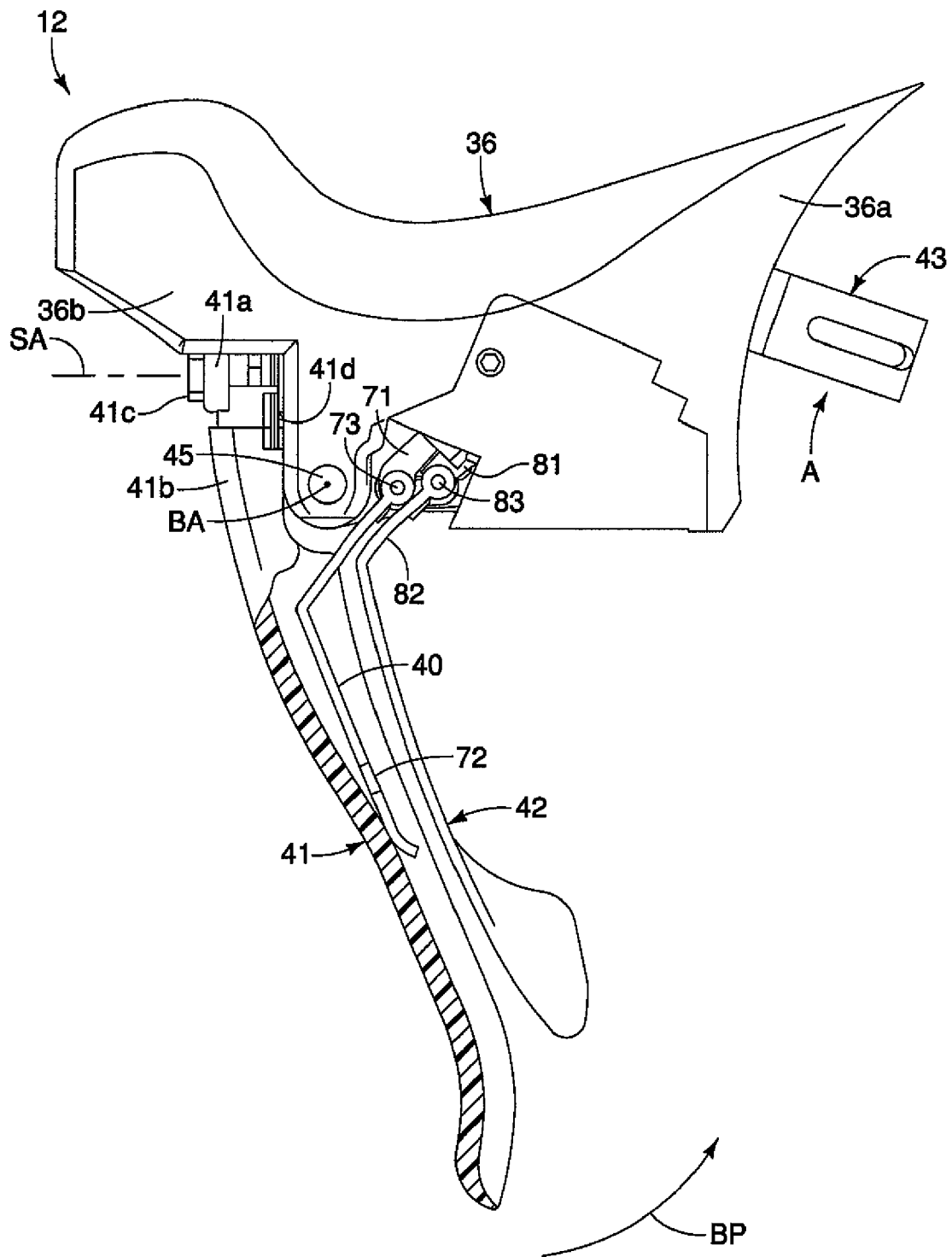
FIG. 6 is an inside elevational view of the right bicycle component actuating (brake/shift) device with the first and second operating levers in the rest positions and a portion of the first shift operating lever broken away to illustrate the sliding connection between the first shift operating lever and the control lever.
Figure 7:
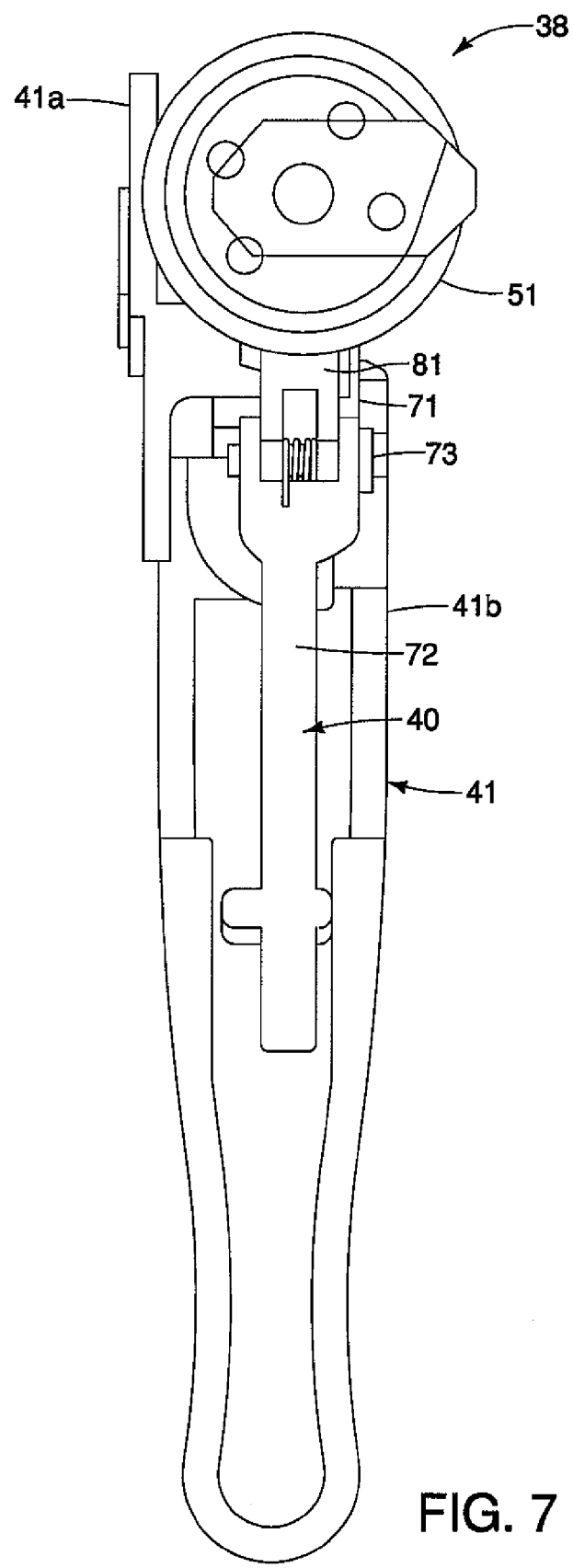
FIG. 7 is a rear end elevational view of the shift control unit and the first shift operating lever of the right bicycle component actuating (brake/shift) device corresponding to FIGS. 4 to 6 with the first and second operating levers in the rest positions.
Figure 8:
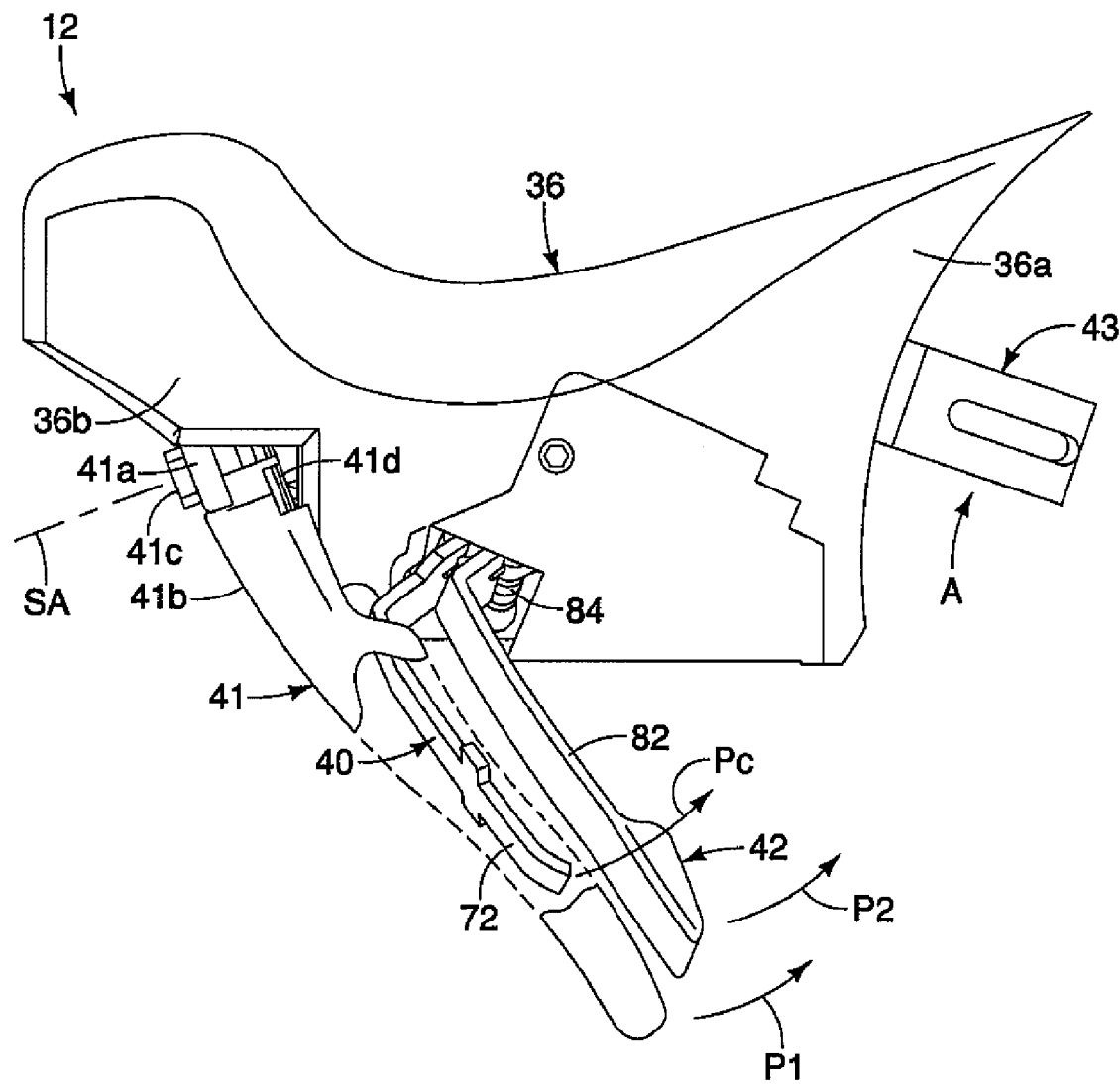
FIG. 8 is an inside elevational view of the right bicycle component actuating (brake/shift) device with the first shift operating lever moved to a shifting position such that the second shift operating lever moves with the first shift operating lever.
Figure 9:
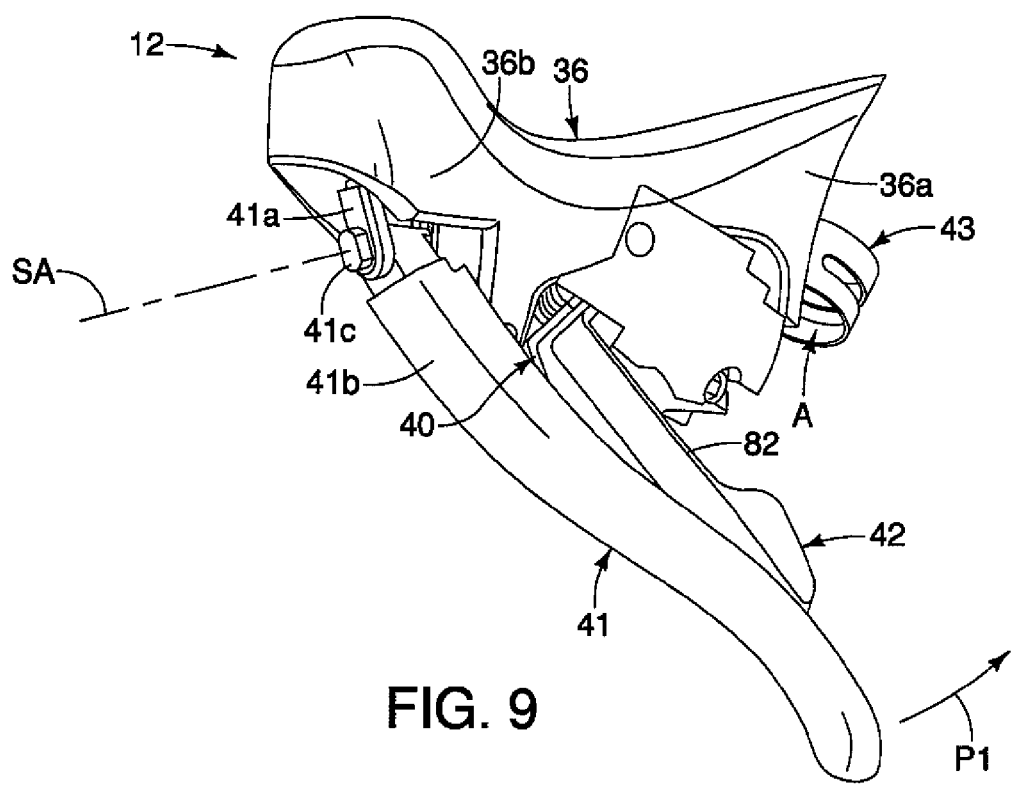
FIG. 9 is an inside perspective view of the right bicycle component actuating (brake/shift) device with the first shift operating lever moved to a shifting position such that the second shift operating lever moves with the first shift operating lever.
Figure 10:
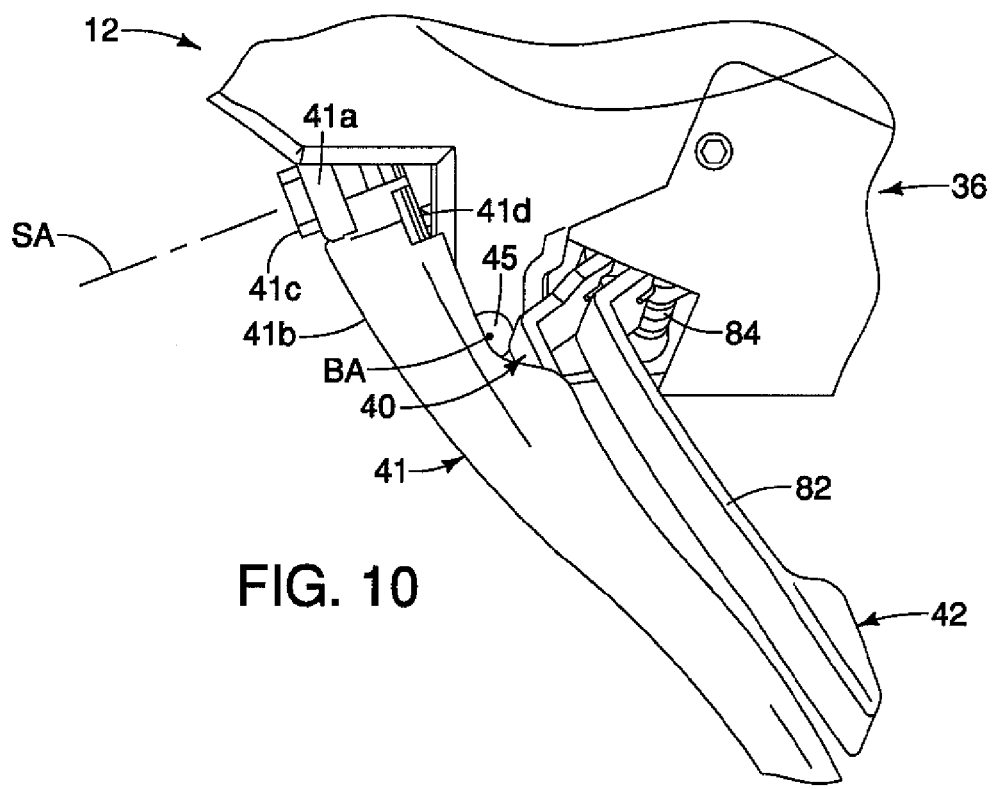
FIG. 10 is an enlarged partial inside elevational view of the right bicycle component actuating (brake/shift) device with the first shift operating lever moved to a shifting position such that the second shift operating lever moves with the first shift operating lever.
Figure 11:
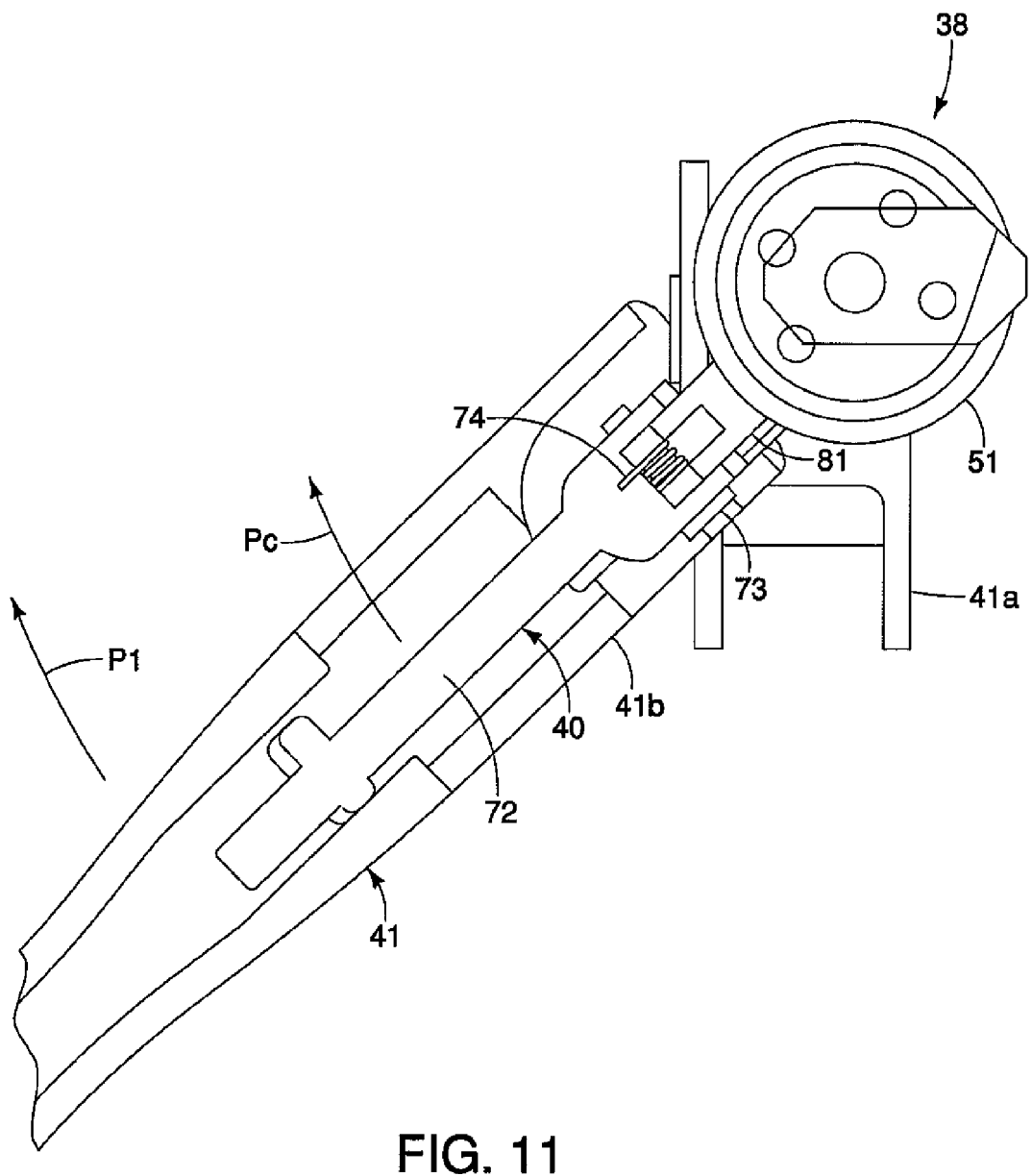
FIG. 11 is a rear end elevational view of the shift control unit and the first shift operating lever of the night bicycle component actuating (brake/shift) device corresponding to FIGS. 8 to 10 with the first shift operating lever moved to a shifting position such that the second shift operating lever moves with the first shift operating lever.
Figure 16:
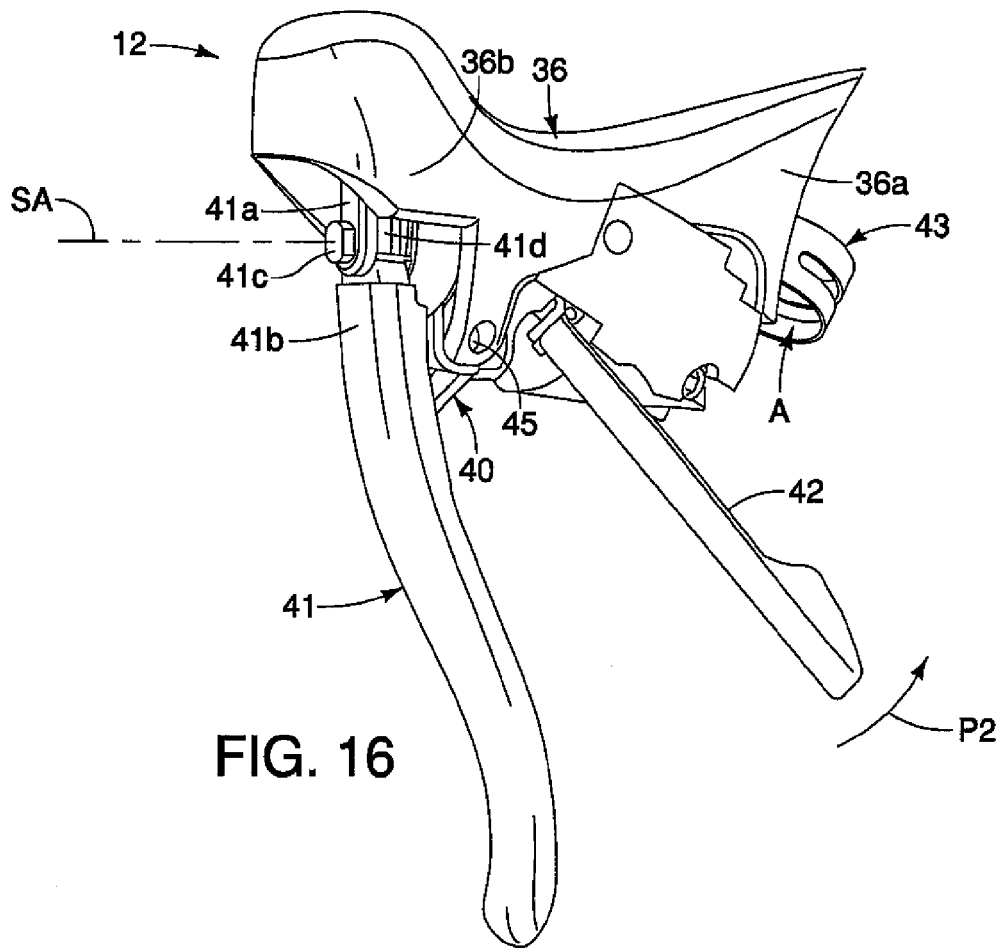
FIG. 16 is an inside perspective view of the night bicycle component actuating (brake/shift) device with the first shift operating lever in the rest position and the second shift operating lever moved to a shifting position.
Figure 17:
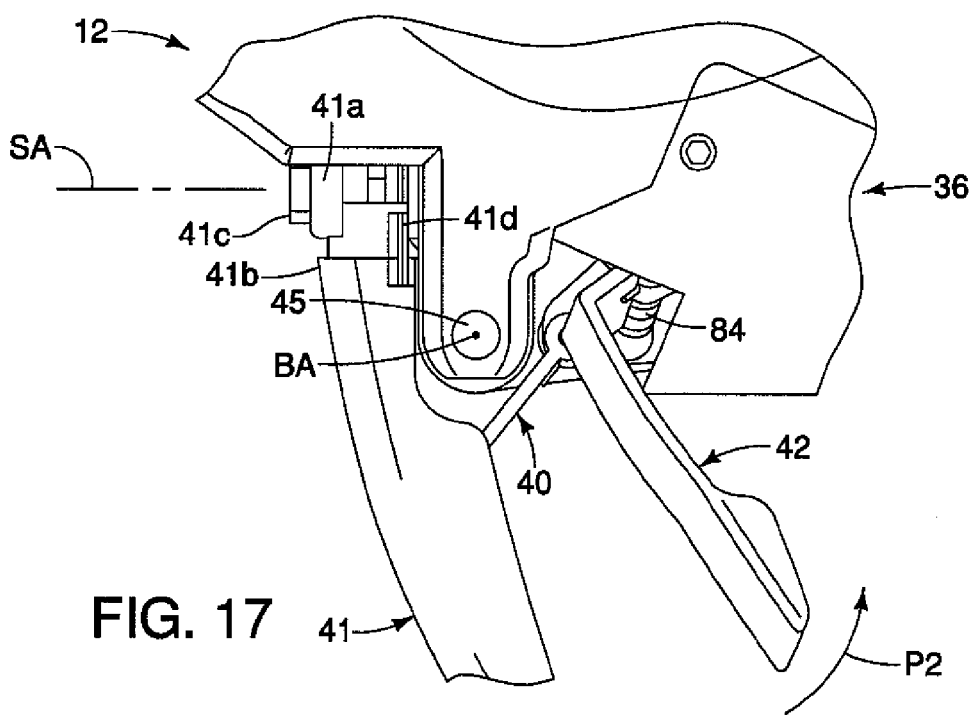
FIG. 17 is an enlarged partial inside elevational view of the right bicycle component actuating (brake/shift) device with the first shift operating lever in the rest positions and the second shift operating lever moved to a shifting position.

As seen in FIGS. 4, 16 and 17, in this illustrated embodiment, the first and second shift operating levers 41 and 42 are configured and arranged relative to each other such that the first shift operating lever 41 remains stationary when the second shift operating lever 42 is operated to move the wire takeup member 51 of shift control unit 38 in the second operating direction D2 about the main pivot shaft 44 of the shift control unit 38. In other words, when a wire releasing operation is desired, the rider pushes the second shift operating lever 42 in a direction transverse to a center plane of the base member 36 along the second shift operating plane or path P2 from a first (rest) position (FIG. 4) to a second (shifting) position (FIGS. 16 and 17) to operate the shift control unit 38. This movement of the second shift operating lever 42 operates the wire takeup member 51 of shift control unit 38 in the second operating direction D2 which is the wire releasing operation in the illustrated embodiment. As mentioned above, the second shift operating lever 42 moves independently with respect to the first shift operating lever 41 as the second shift operating lever 42 is moved from the first (rest) position to the second (shifting) position to operate the shift control unit 38.

Referring now to FIGS. 18 to 21, the shift control unit 38, the first shift operating lever 41 and the second shift operating lever 42 will now be discussed in more detail.

The shift control unit 38 is mounted to the base member 36 by a main pivot shaft 44. The shift control unit 38 is basically operated by the first and second shift operating levers 41 and 42 to pull or release the inner wire of the shift control cable 20. The shift control unit 38 is mounted to the base member 36 by the main pivot shaft 44 as mentioned above.

In addition to the wire takeup member 51, mentioned above, the shift control unit 38 further includes a winding plate or member 52, a winding pawl 53, a positioning plate or member 54, a pair of positioning pawls 55, a release plate or member 56 and a release pawl 57. The wire takeup member 51, the winding plate 52, the positioning plate 54 and the release plate 56 are all rotatably mounted on the main pivot shaft 44. The wire takeup member 51, the winding plate 52 and the positioning plate 54 are fixed together as an integrated unit so as to rotate together. The release plate 56 can rotate independently of the wire takeup member 51, the winding plate 52 and the positioning plate 54.

A return spring or biasing element 58 is preferably operatively coupled between the wire takeup member 51 and the base member 36 to urge the wire takeup member 51, the winding plate 52 and the positioning plate 54 in the wire releasing direction about the main pivot shaft 44. In the illustrated embodiment, the return spring or biasing element 58 is a torsion spring with one end fixed to the wire takeup member 51 and the other end fixed to the base member 36.

A return spring or biasing element 59 is preferably operatively coupled between the second shift operating lever 42 and the control member 40 to urge the second shift operating lever 42 to the control member 40. In the illustrated embodiment, the return spring or biasing element 59 is a torsion spring mounted on the main pivot shaft 44 with one end fixed to the second shift operating lever 42 and the other end fixed to the control member 40 that is maintained in the rest position by the positioning mechanism 41e. Thus, the first and second shift operating levers 41 and 42 are normally maintained in the rest positions.

The first shift operating lever 41 is configured and arranged relative to the wire takeup member 51 such that the first shift operating lever 41 performs the wire pulling operation of the wire takeup member 51 when the first shift operating lever 41 is operated. The second shift operating lever 42 is configured and arranged relative to the wire takeup member 51 such that the second shift operating lever 42 performs the wire releasing operation of the wire takeup member 51 when the second shift operating lever 42 is operated.

Figure 18:
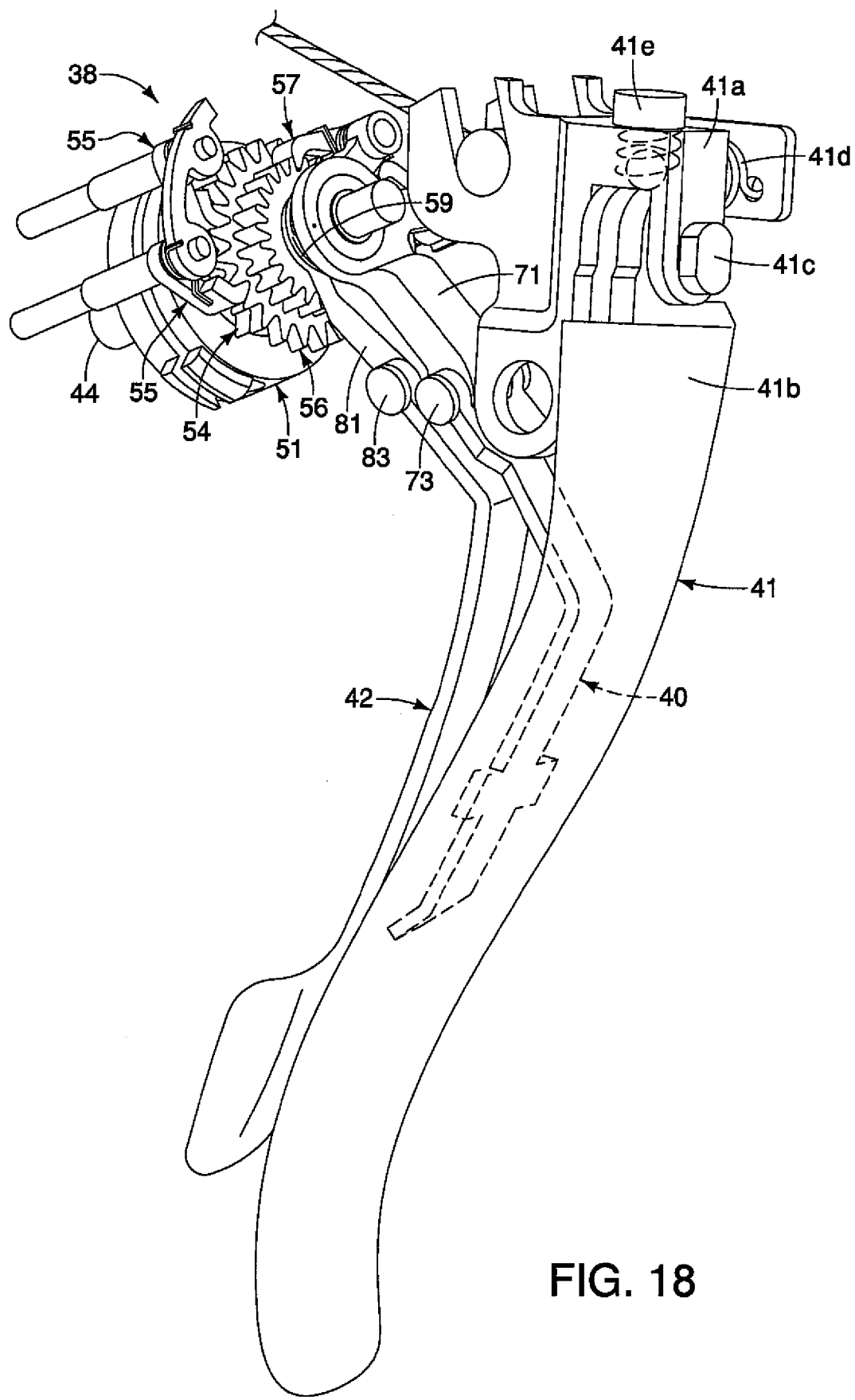
FIG. 18 is an enlarged partial perspective view of the shift control unit of the right bicycle component actuating (brake/shift) device with the first and second shift operating levers in the rest positions.
Figure 19:
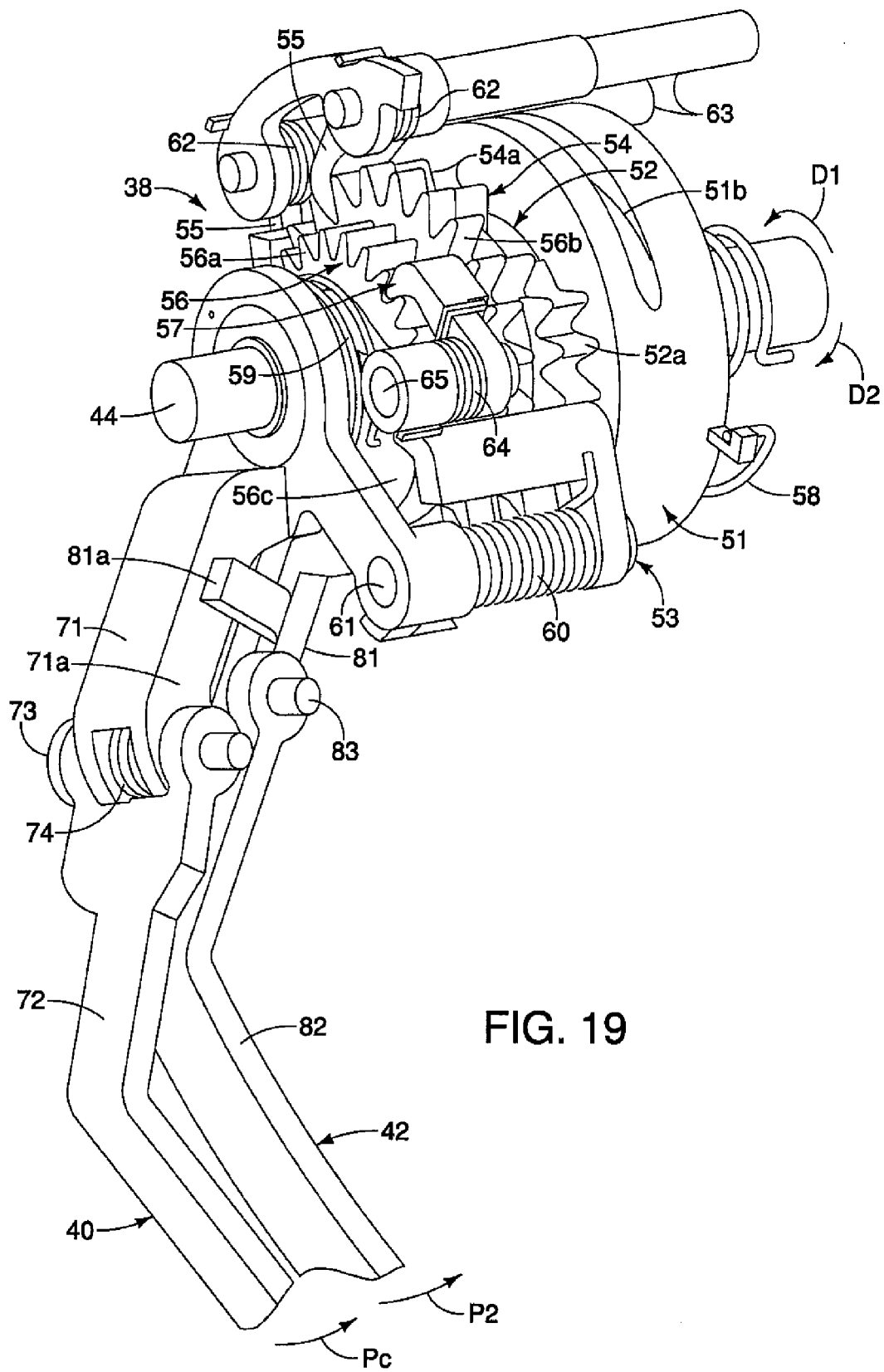
FIG. 19 is an enlarged partial perspective view of the shift control unit of the right bicycle component actuating (brake/shift) device.
Figure 20:
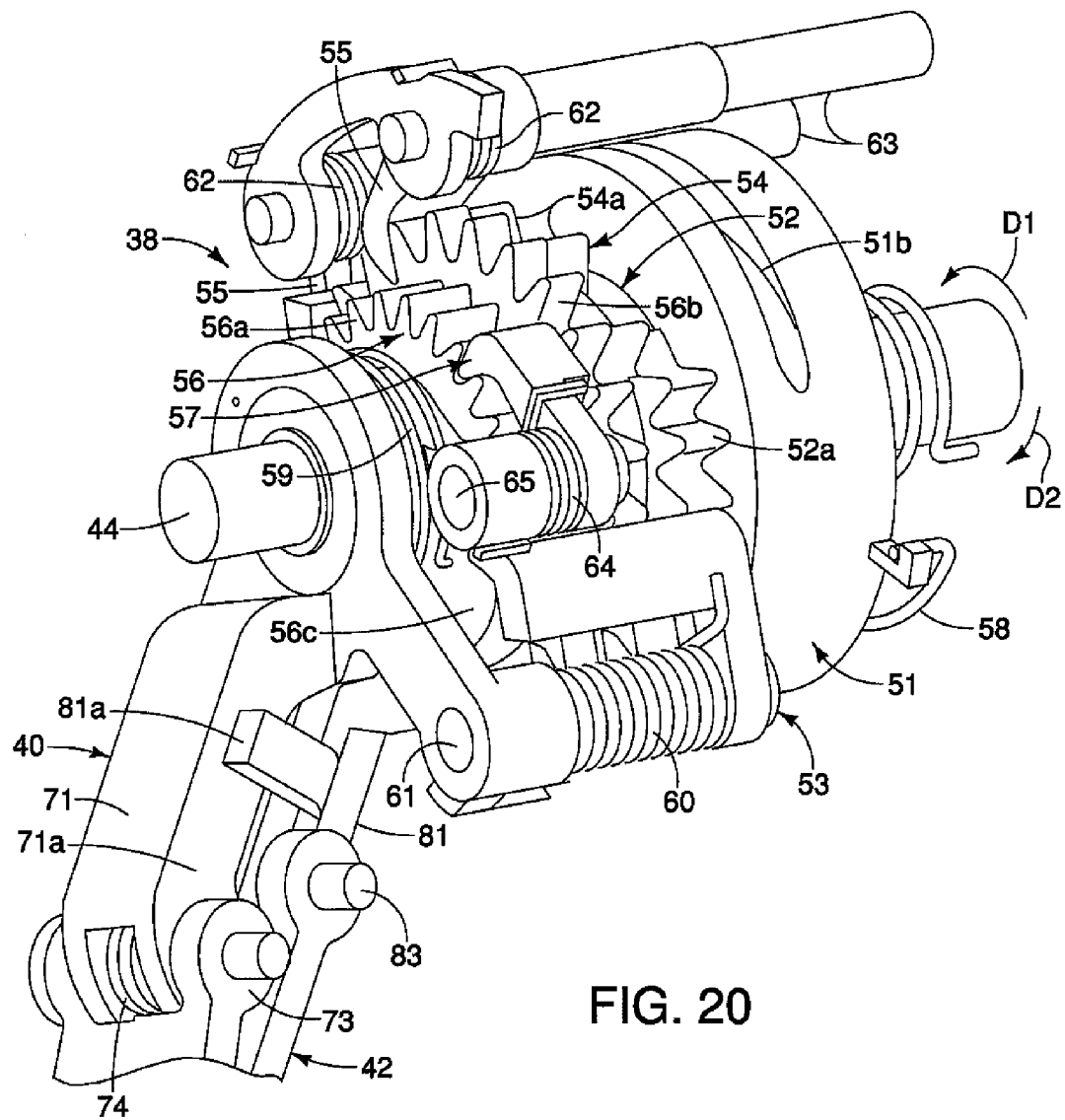
FIG. 20 is an enlarged partial perspective view of the shift control unit of the right bicycle component actuating (brake/shift) device.
Figure 21:
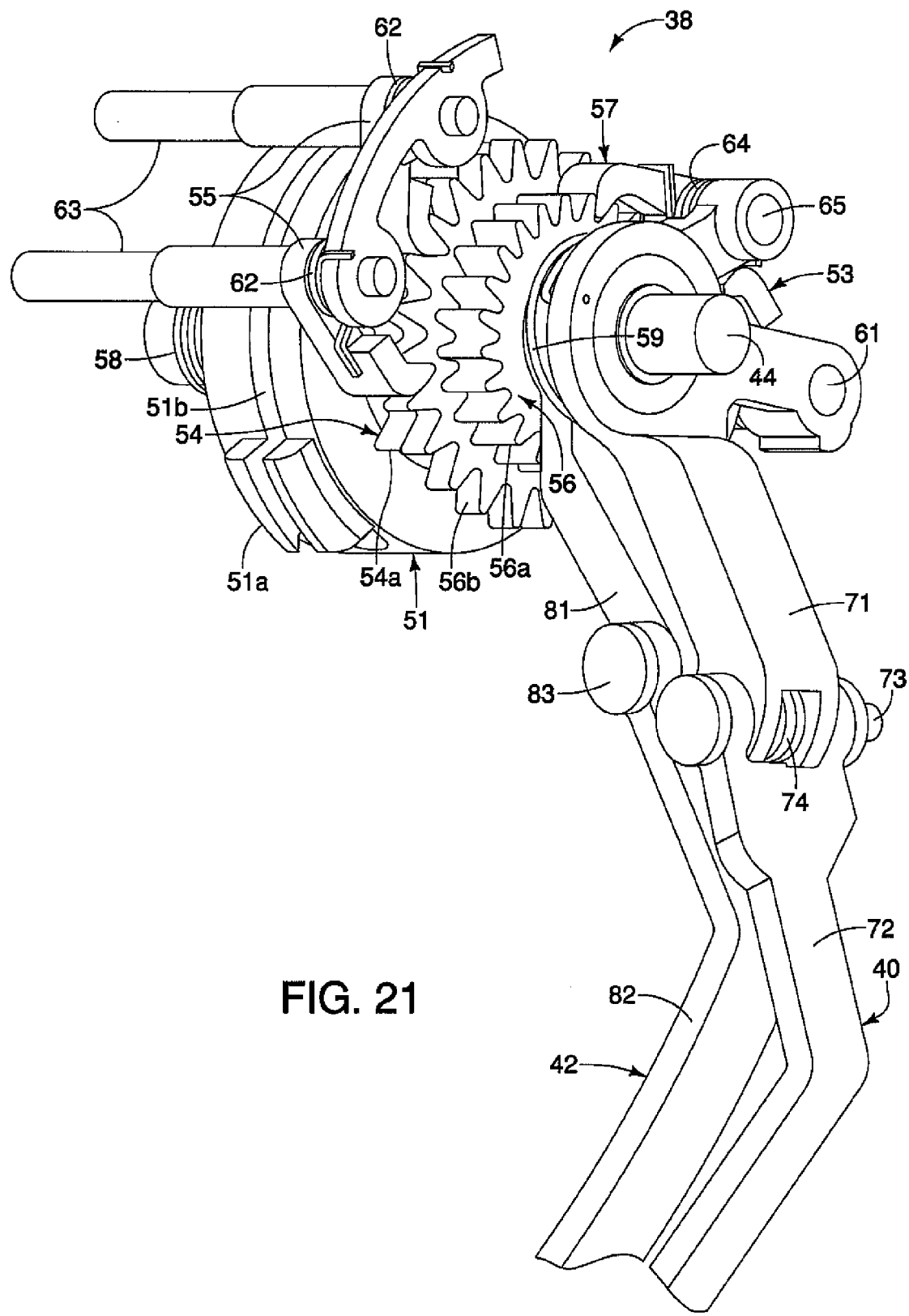
FIG. 21 is an enlarged partial perspective view of the shift control unit of the right bicycle component actuating (brake/shift) device.

The wire takeup member 51 is a wheel shaped member that has a peripheral edge with a cable attachment structure or point 51a and a wire receiving groove 51b as best seen in FIGS. 18 and 21. Thus, the wire takeup member 51 winds and unwinds the inner wire of the control cable 20 thereon.

The winding plate 52 is fixedly coupled to the wire takeup member 51 so as to rotate together. The winding plate 52 includes a plurality of winding teeth 52a that are selectively engaged by the winding pawl 53. The winding pawl 53 is pivotally mounted to the first shift operating lever 41, which in turn is pivotally mounted to the main pivot shaft 44. When the first shift operating lever 41 is moved from the first (rest) position to the second (shifting) position to operate the shift control unit 38, the winding pawl 53 engages the winding teeth 52a of the winding plate 52 to rotate the wire takeup member 51 in the wire pulling direction. The winding pawl 53 is normally urged towards engagement with the winding teeth 52a of the winding plate 52 by a biasing member 60. In this illustrated embodiment, the biasing member 60 is a torsion spring that is mounted on a pivot pin 61 which in turn attaches the winding pawl 53 to the first shift operating lever 41.

The positioning plate 54 cooperates with the positioning pawls 55 to maintain the wire takeup member 51 in one of a plurality of predetermined shift positions. In particular, the positioning plate 54 includes a plurality of positioning teeth 54a that are selectively engaged by the positioning pawls 55. Each of the positioning pawls 55 is normally urged towards engagement with the positioning teeth 54a of the positioning plate 54 by a biasing member 62. In this illustrated embodiment, the biasing members 62 are torsion springs that are mounted on pivot pins 63 which in turn attach the positioning pawls 55 to the base member 36. When the first shift operating lever 41 is moved from the first (rest) position to the second (shifting) position to operate the shift control unit 38, the positioning plate 54 is rotated so that the positioning teeth 54a of the positioning plate 54 move the positioning pawls 55 momentarily out of holding engagement with the positioning teeth 54a of the positioning plate 54. Thus, the positioning teeth 54a of the positioning plate 54 are ratchet teeth that are configured and arranged to ratchet the positioning pawls 55 when the wire takeup member 51 is rotated in the wire pulling direction.

The release plate 56 cooperate with the positioning pawls 55 to release the wire takeup member 51 so that the wire takeup member 51 rotates in the wire releasing direction due to the urging force of the return spring or biasing element 58 and a cable tension due to, for example, a pull force from the rear derailleur 18. In particular, the release plate 56 includes a plurality of driving teeth 56a, a plurality of release teeth 56b and a winding pawl disengagement portion 56c. The driving teeth 56a are selectively engaged by the release pawl 57, while the release teeth 56b selectively engage the positioning pawls 55. The winding pawl disengagement portion 56c moves the winding pawl 53 out of engagement with the winding teeth 52a of the winding plate 52 so that the winding plate 52 can rotate with respect to the winding pawl 53, when the second shift operating lever 42 is moved from the first (rest) position to the second (shifting) position to operate the shift control unit 38 in the wire releasing (unwinding) direction.

The release pawl 57 is normally urged towards engagement with the driving teeth 56a of the release plate 56 by a biasing member 64. In this illustrated embodiment, the biasing member 64 is a torsion spring that is mounted on a pivot pin 65 which in turn attaches the release pawl 57 to the second shift operating lever 42. When the second shift operating lever 42 is moved from the first (rest) position to the second (shifting) position to operate the shift control unit 38, the release plate 56 is rotated so that the release teeth 56b selectively engage the positioning pawls 55 to release the positioning plate 54. In particular, the release teeth 56b are ratchet teeth that are configured and arranged to ratchet the positioning pawls 55 when the release plate 56 is rotated in the first operating direction D1. Thus, the release plate 56 releases the wire takeup member 51 to rotates in a wire releasing direction due to the urging force of the return spring or biasing element 58 and the cable tension in response to movement of the second shift operating lever 42.

The control member 40 is pivotally mounted to the main pivot shaft 44 to move along an operating plane Pc. The operating plane Pc intersects with the non-shift (brake) operating plane or path BP (movement plane) of the first shift operating lever 41 and being parallel with the second operating plane P2. The control member 40 is located behind the first shift operating lever 41 and the control member 40 is located in front of the second shift operating lever 42, when the first and second shift operating levers 41 and 42 are in rest positions.

In particular, the control member 40 basically includes a first portion 71 operatively coupled to the shift control unit 38 and a second portion 72 spaced from the first portion 71. The first portion 71 is operatively coupled to the shift control unit 38. In particular, the first portion 71 of the control member 40 is pivotally connected to the shift control unit 38 about the pivot axis of the main pivot shaft 44 to operate the shift control unit 38 when the first shift operating lever 41 is operated along the first shift operating plane or path P1. The second portion 72 is spaced from the first portion 71 and contacts the rear surface of the first shift operating lever 41. Thus, the first shift operating lever 41 is slidably engaged with the second portion 72 of the control member 40 such that the second portion 72 of the control member 40 is moved when the first shift operating lever 40 is moved along the non-shift operating path BP with sliding contact therebetween.

Figure 13:
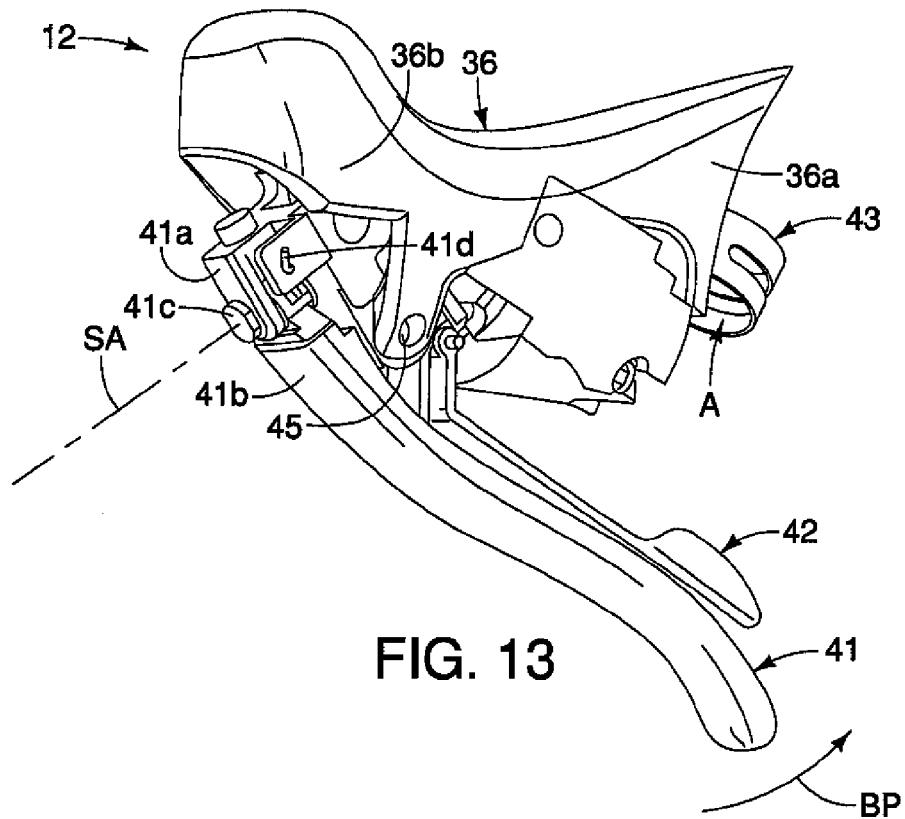
FIG. 13 is an inside perspective view of the right bicycle component actuating (brake/shift) device with the first shift operating lever moved to a braking position and the second shift operating lever moved to a non-shifting position by the first shift operating lever.
Figure 14:
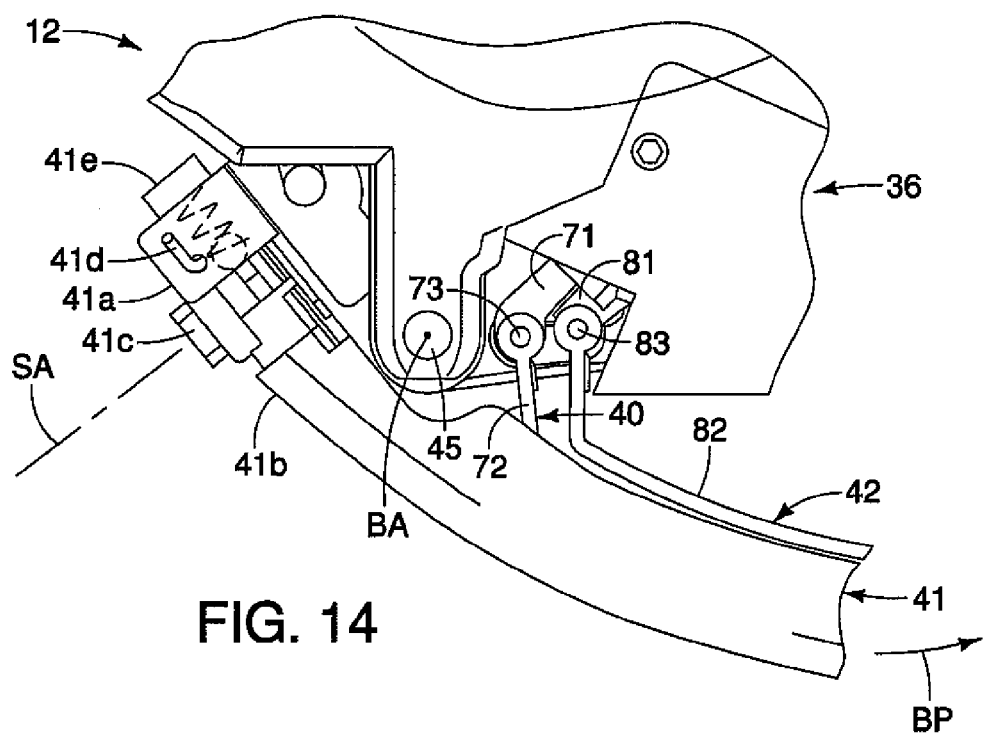
FIG. 14 is an enlarged partial inside elevational view of the right bicycle component actuating (brake/shift) device with the first shift operating lever moved to a braking position and the second shift operating lever moved to a non-shifting position by the first shift operating lever.
Figure 15:
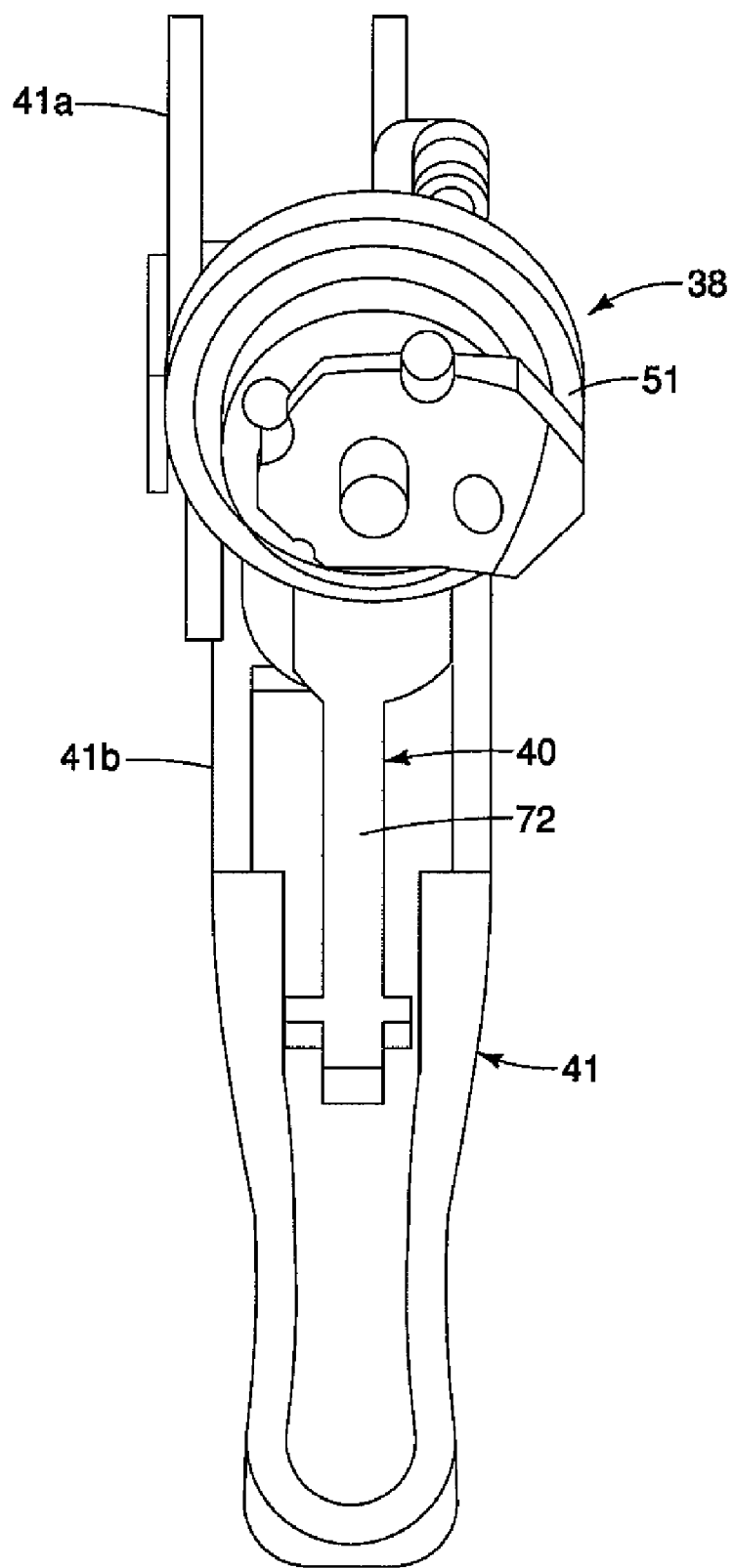
FIG. 15 is a rear end elevational view of the shift control unit and the first shift operating lever of the right bicycle component actuating (brake/shift) device corresponding to FIGS. 12 to 14 with the first shift operating lever moved to a braking position.

A hinge pin 73 pivotally interconnecting the first and second portions 71 and 72 together. A biasing element 74 is mounted on the hinge pin 73 to urge the second portion 72 forwardly with respect to the first portion 71 to a rest position. This intermediate hinge between the first and second portions 71 and 72 allows the second portion 72 to pivot rearwardly with respect to the first portion 71 such as when the first shift operating lever 41 is operated from the rest (non-braking) position to the braking position as seen in FIGS. 12 to 14. In other words, the control member 40 includes an intermediate hinge such that the second portion 72 of the control member 40 is pivoted in non-operating direction when the first shift operating lever 41 is operated.

The first portion 71 of the control member 40 has an abutment 71a (side surface) for moving the second shift operating lever 42 when the first shift operating lever 41 is operated. When the wire pulling operation is desired, the rider pushes the first shift operating lever 41 in a direction transverse to the non-shift (brake) operating plane or path BP (movement plane) of the first shift operating lever 41 along the first shift operating plane or path P1 from the first (rest) position to a second (shifting) position. This movement of the first shift operating lever 41 causes the control member 40 to move therewith to operate the shift control unit 38.

The second shift operating lever 42 is pivotally mounted to the main pivot shaft 44 to move along the second shift operating plane or path P2. The second shift operating plane P2 intersects with the non-shift (brake) operating plane or path BP (movement plane) of the first shift operating lever 41. The second shift operating lever 41 and the control member 40 pivot about a coincident pivot axis of the main pivot shaft 44 when performing shifting operations. The second shift operating lever 42 is located behind the first shift operating lever 41, when the first and second shift operating levers 41 and 42 are in rest positions.

In particular, the second shift operating lever 42 basically includes a first portion 81 operatively coupled to the shift control unit 38 and a second portion 82 spaced from the first portion 81. A hinge pin 83 pivotally interconnecting the first and second portions 81 and 82 together A biasing element 84 is mounted on the hinge pin 83 to urge the second portion 82 forwardly with respect to the first portion 81 to a rest position. This hinge between the first and second portions 81 and 82 allows the second portion 82 to pivot rearwardly with respect to the first portion 81 such as when the first shift operating lever 41 is operated from the rest (non-braking) position to the braking position as seen in FIGS. 12 to 15. In other words, the second shift operating lever 42 includes a hinge such that the second portion 82 of the second shift operating lever 42 is pivoted in a non-operating direction when the first shift operating lever 41 is operated.

The first portion 81 of the second shift operating lever 42 has an abutment 81a (flange) contacts the abutment 71a of the control member 40 such that the second shift operating lever 42 moves with the first shift operating lever 41 when the first shift operating lever 41 is operated. Thus, the abutments 71a and 81a are configured and arranged relative to each other such that the second shift operating lever 42 is moved by the first shift operating lever 41. The second portion 82 of the second shift operating lever 42 has a finger contact portion located at the end opposite the hinge for moving the second shift operating lever 42 about the main pivot shaft 44 of the shift control unit 38. When the wire releasing operation is desired, the rider pushes the finger contact portion of the second shift operating lever 42 in a direction transverse to the non-shift (brake) operating plane or path BP (movement plane) of the first shift operating lever 41 along the second shift operating plane or path P2 from the first (rest) position to a second (shifting) position to operate the shift control unit 38.

In the above discussed embodiment, the shift control unit 38 is illustrated as a cable operating shift control unit, which is merely one example of a shift control unit that can be used with the bicycle control device 12. In other words, the shift control unit for the bicycle control device 12 is not limited to a cable operating system, but rather other types of shift control units can be used with the bicycle control device 12 described and illustrated herein. For example, the shift control unit 38 can be replaced an electrical shift control unit, or a pneumatic shift control unit, or hydraulic shift control unit. In the case of an electrical shift control unit, at least a pair of electrical switches would be provided for performing upshift and downshift operations in response to selective movements of the first and second shift operating levers 41 and 42. In the case of a pneumatic shift control unit or hydraulic shift control unit, a valve system would be provided for performing upshift and downshift operations in response to selective movements of the first and second shift operating levers 41 and 42.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising:
   a base member having a rear handlebar mounting end and a forward free end spaced from the rear handlebar mounting end;
   a shift control unit mounted to the base member;
   a control member including a first portion operatively coupled to the shift control unit and a second portion spaced from the first portion; and
   a first shift operating lever movably coupled relative to the base member to move along a first shift operating path and movably coupled relative to the base member to move along a non-shift operating path that is non-coincident with the first shift operating path,
   the first shift operating lever being spaced forwardly from the rear handlebar mounting end and the control member being located behind the first shift operating lever, with the first shift operating lever being slidably engaged with the second portion of the control member such that the second portion of the control member is moved together with the first shift operating lever along the non-shift operating path when the first shift operating lever is moved along the non-shift operating path with sliding contact therebetween.

2. The bicycle control device according to claim 1, wherein the first portion of the control member is pivotally connected to the shift control unit about a pivot axis to operate the shift control unit when the first shift operating lever is operated along the first shift operating path.

3. The bicycle control device according to claim 2, wherein the control member includes an intermediate hinge located between the first and second portions such that the second portion of the control member pivots relative to the first portion of the control member when the first shift operating lever is operated along the non-shift operating path.

4. The bicycle control device according to claim 1, further comprising
   a second shift operating lever operatively coupled to the shift control unit to move along a second shift operating path to operate the shift control unit in an opposite direction from a direction due to operation of the first shift operating lever.

5. The bicycle control device according to claim 4, wherein the second shift operating lever and the control member pivot about a coincident pivot axis when performing shifting operations.

6. The bicycle control device according to claim 4, wherein the shift control unit includes a wire takeup member.

7. The bicycle control device according to claim 6, wherein the first shift operating lever is configured and arranged relative to the wire takeup member to perform a wire pulling operation of the wire takeup member when the first shift operating lever is operated along the first shift operating path, and
   the second shift operating lever is configured and arranged relative to the wire takeup member to perform a wire releasing operation of the wire takeup member when the second shift operating lever is operated along the second shift operating path.

8. The bicycle control device according to claim 7, wherein the first shift operating lever is configured and arranged to remain stationary when the second shift operating lever is operated along the second shift operating path.

9. The bicycle control device according to claim 7, wherein the first shift operating lever is further configured and arranged to perform a braking operation when the first shift operating lever is operated along the non-shift operating path.

10. The bicycle control device according to claim 4, wherein
    the first shift operating lever and the second shift operating lever are aligned in the non-shift operating path of the first shift operating lever, when the first shift operating lever and the second shift operating lever are in rest positions.

11. The bicycle control device according to claim 1, wherein
    the first shift operating lever and control member pivot about separate pivot axes when the control member and the first shift operating lever are moved along the non shift operating path.

* * * * *